United States Patent [19]
Radice

[11] Patent Number: 5,138,440
[45] Date of Patent: Aug. 11, 1992

[54] METHOD AND APPARATUS FOR COMMUNICATING A PLURALITY OF ASYNCHRONOUS SIGNALS OVER A DIGITAL COMMUNICATION PATH

[75] Inventor: Anthony M. Radice, Riverside, N.J.

[73] Assignee: General Instrument Corporation, Hatboro, Pa.

[21] Appl. No.: 604,868

[22] Filed: Oct. 29, 1990

[51] Int. Cl.⁵ .................... H04N 11/06; H04N 7/04
[52] U.S. Cl. ...................... 358/13; 370/94.1; 370/110.1; 358/141
[58] Field of Search ............... 358/13, 141; 370/94.1, 370/111, 112, 84, 110.1

[56] References Cited

U.S. PATENT DOCUMENTS

| | | | |
|---|---|---|---|
| 3,742,145 | 6/1973 | Clark et al. | 370/102 |
| 3,873,773 | 3/1975 | Guy, Jr. | 370/102 |
| 3,995,119 | 11/1976 | Pachynski, Jr. | 370/111 |
| 4,107,469 | 8/1978 | Jenkins | 370/110.1 |
| 4,484,328 | 11/1984 | Schlafly | 358/146 |
| 4,852,084 | 7/1989 | Verbiest et al. | 370/94.1 |
| 4,855,999 | 8/1989 | Chao | 370/112 |

Primary Examiner—John K. Peng
Attorney, Agent, or Firm—Barry R. Lipsitz

[57] ABSTRACT

Multiple asynchronous signals are transmitted and received through a digital link. Each of a plurality of information signals is digitized at a digitizing rate derived from a component of the signal. For example, the color subcarrier of a television signal can be used to establish the digitizing rate for video and audio signal portions. Each digitized signal is packetized for communication at a transmission rate greater than and asynchronous with its digitizing rate. A variable time interval results between successive transmitted packets for each signal. The time interval between each successive packet for each signal is filled with a variable number of pad bits to provide a continuous data stream. The data streams for all of the signals are multiplexed to provide a combined data stream for transmission. Each packet for each of the signals contains a fixed number of data bits digitized over a fixed time interval related to the digitizing rate for the signal. The transmitted combined data stream is received, and the receipt of successive packets is monitored for each signal to determine the fixed time interval for that signal. The digitizing rate for each signal is computed from its fixed time interval. The received data packets for each signal are then converted to an analog form at the signal's digitizing rate to reconstruct the original information signals.

60 Claims, 4 Drawing Sheets

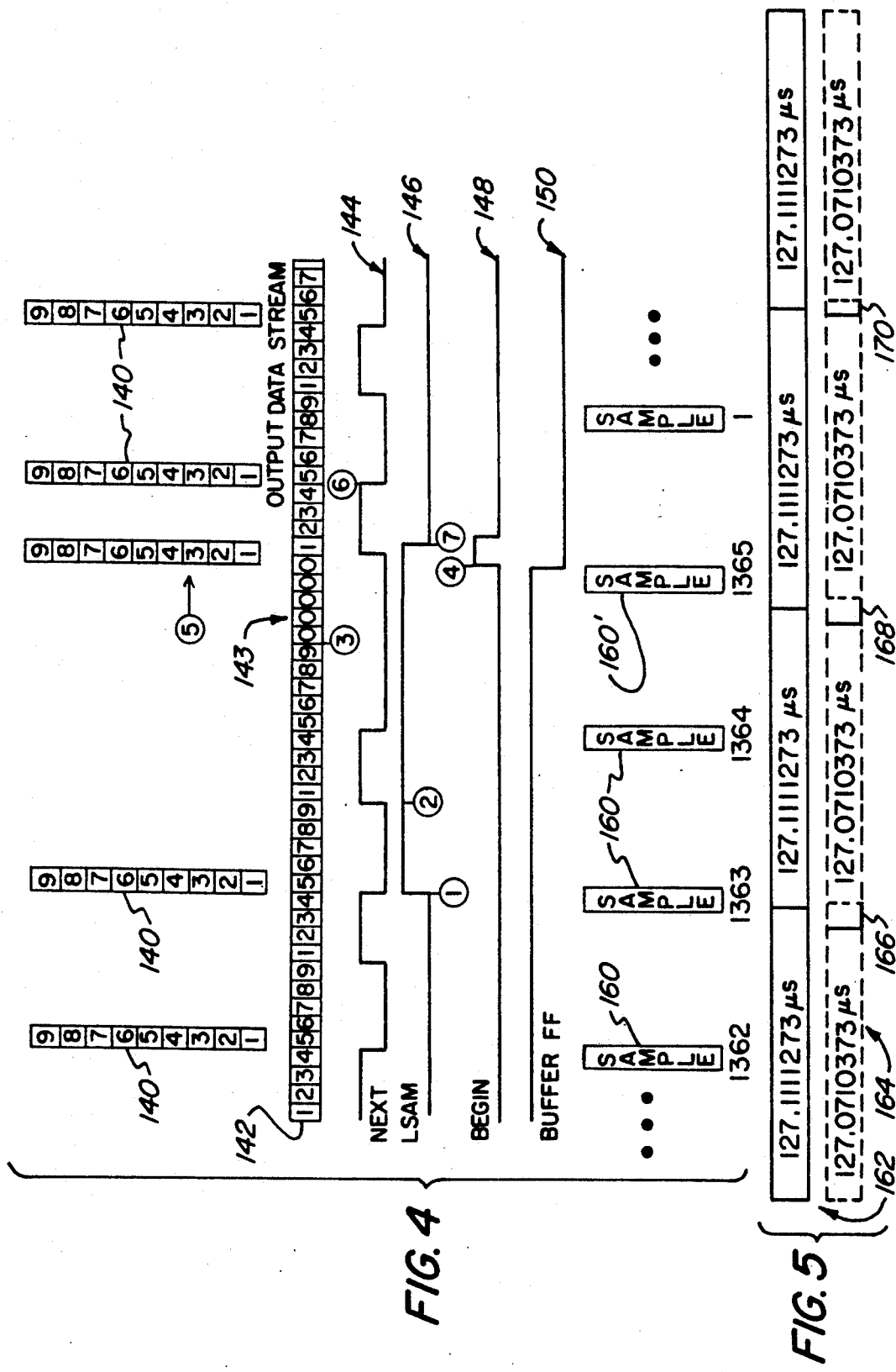

METHOD AND APPARATUS FOR COMMUNICATING A PLURALITY OF ASYNCHRONOUS SIGNALS OVER A DIGITAL COMMUNICATION PATH

BACKGROUND OF THE INVENTION

The present invention relates to digital communication systems, and more particularly to a method and apparatus for receiving multiple asynchronous signals through a digital link.

Digital signal transmission is used in a variety of applications. One application is the transmission of digitized television signals over a cable television network. The transmission of digitized television signals is particularly applicable in an optical fiber cable television distribution system.

The replacement of coaxial cable with optical fiber transmission lines in television distribution systems has become a high priority. Production single mode fiber can support virtually unlimited bandwidth and has low attenuation. Accordingly, a fiber optic distribution system or a fiber-coax cable hybrid would provide substantially increased performance at a competitive cost as compared to prior art coaxial cable systems.

One problem in implementing an optical fiber distribution system for cable television signals is to provide an economical means for multiplexing a plurality of channel signals for transmission. Normally, transmission of multiple signals in a time-domain multiplex system requires that the digitizing rates for the incoming signals not only be equal, but fixed in phase relationship from one signal to the next. For multiple source complex signals such as asynchronous video feeds (e.g., television signals formatted in accordance with the National Television Standards Committee "NTSC" standards), this requires the use of a frame synchronizer for each television channel signal. Each frame synchronizer is locked to a master time base, that is directly related to the transmission rate so as to prevent logic race conditions, signal skewing and other problems. Such a system of synchronizing all input signals is cumbersome, equipment intensive, and expensive.

It would be advantageous to provide a system for transmitting and receiving multiple asynchronous digital signals that does not require the use of frame synchronizers for each channel. Such a system would save cost, power, hardware requirements and result in reduced system maintenance requirements. The present invention provides a system having these and other advantages.

SUMMARY OF INVENTION

In accordance with the present invention, a method and apparatus are provided for communicating signals over a digital communication path. An information signal, such as a television channel signal, is digitized at a "first rate". The digitized signal is packetized for transmission at a "second rate" greater than and asynchronous with the first rate. As a result, a variable time interval occurs between successive transmitted packets. The time intervals are filled with a variable number of pad bits to provide a continuous data stream for transmission.

Each packet contains a fixed number of data bits digitized over a fixed time interval related to the first rate at which the information signal is digitized. If the information signal is a television signal, the first rate can be derived from a subcarrier frequency thereof. For example, the color subcarrier of a television signal is nominally 3.579545 MHz. It is convenient to set the digitizing rate at a fixed multiple of this frequency.

The continuous data stream is transmitted over a coaxial cable, optical fiber, or other broadcast medium. At a receive, the receipt of successive packets is monitored to determine the time interval over which the fixed number of data bits were digitized at the transmitter. The digitizing rate (first rate) is then computed from this information, and used to reconstruct the original information signal from the received data packets. In a preferred embodiment, the first rate used to digitize a television signal is computed at the receiver by dividing the fixed time interval for the received packets by the number of video data samples contained in each packet. The fixed time interval is determined at the receiver by detecting a header sent at the beginning of each data packet and measuring the time between successive received headers.

When the system of the present invention is used to communicate a plurality of asynchronous signals, each signal is separately digitized at a unique rate, the digitized signals are packetized, pad bits are inserted into the time interval between successive transmitted packets for each signal, and the plurality of digitized, packetized signals are multiplexed into a single data stream for transmission. The combined data stream is received at a receiver, and demultiplexed to separate the individual packets for each channel. The receipt of successive packets for each channel is monitored to determine the fixed time interval for that signal, and the digitizing rate for the signal is computed therefrom. The data packets for each channel are then converted to analog form at the computed digitizing rate for the channel to reconstruct the original plurality of channel signals.

In a more specific embodiment, apparatus is provided for communicating signals over a digital communication path. An information signal is digitized at a first rate to provide digital data for processing into data packets. A periodic "begin" signal is provided that is synchronous with the first rate and indicative of the occurrence of successive new data packets. Means are provided for outputting the data packets for transmission at a second rate greater than and asynchronous with the first rate, thereby producing a variable time interval between successive transmitted packets. Means operatively associated with the outputting means and responsive to the begin signal are provided, for filling the time intervals between successive packets with pad bits to provide a continuous data stream for transmission.

A receiver for receiving the transmitted data packets includes means responsive to the received data packets for generating a timing signal corresponding to the first rate. Means responsive to the timing signal reconstruct the information signal from the received data packets. In a preferred embodiment, the information signal is a communication signal having at least one subcarrier. The first rate is derived from the frequency of the subcarrier. Where the information signal is a television signal, the first rate can be advantageously derived from the color subcarrier frequency.

Encoder (i.e., transmitter) apparatus in accordance with the present invention can comprise buffer means coupled to receive the digitized data at the first rate for storage. The packetizing means are coupled to receive data from the buffer means at the second rate for processing into data packets. The time interval into which pad bits are inserted corresponds to the difference in time it takes the buffer means to receive data at the first rate and the time it takes to output the data packets for transmission at the second rate. Processing of the data by the buffers and packetizing means can be in a parallel format. In this instance, the data is converted to a serial format for transmission.

The buffer means can comprise a pair of complementary buffers with associated switch means. The switch means couple one buffer of the pair to receive data from the digitizing means while the other buffer of the pair is coupled to output data to the packetizing means, and vice-versa. The switch means are responsive to the begin signal for alternately coupling the buffers to receive data and output data in complement.

In an embodiment where the information signal is a television signal, the digitizing means can comprise a first analog to digital converter for digitizing a video portion of the television signal at the first rate. A second analog to digital converter is provided for digitizing an audio portion of the television signal at a digitizing rate that is synchronous with the first rate. Means can also be provided for inputting auxiliary data to the packetizing means for incorporation into the data packets. In a cable television system, such auxiliary data can include, for example, control information for pay-per-view processors, cable converter addressing information, teletext information, or any similar type of data.

BRIEF DESCRIPTION OF THE DRAWINGS

FIG. 2a is a key to the clock lines depicted in FIGS. 2 and 3;

FIG. 4 is a timing diagram illustrating the formation of a data stream for transmission in accordance with the present invention; and FIG. 5 is a diagram illustrating the timing relationship between incoming data and transmitted data with pad bits.

DETAILED DESCRIPTION OF THE INVENTION

Unlike prior art systems, the system of the present invention does not require the use of a separate frame synchronizer for each channel of digital data to be transmitted in a multiplexed data stream. In order to achieve this objective, each input signal in accordance with the present invention is digitized at a first rate, and converted to a serial digital stream having a fixed number of samples. This fixed set of samples is carried in an envelope on a digital carrier. The envelope comprises a packet plus a group of pad bits. Since the number of pad bits varies depending on the time between successive data packets, the envelope can vary in size, thereby taking a varying length of time to receive. The size of the envelope is determined by how fast the incoming data is being digitized with respect to a faster rate at which it is being transmitted.

When the system of the present invention is used to transmit television signals, the input signal digitizing rate for a particular television channel is derived from and synchronous with the color subcarrier of the channel. Therefore, the time required to transmit and receive an envelope will be related to the subcarrier frequency. This relationship is utilized in the receiver to help control an output oscillator, which in turn controls reconstruction of the original channel signal.

As noted, the length of each transmitted envelope is varied by using pad bits at the end of each data packet sequence. Because each packet on each channel may vary in length, the signals may appear to "walk" past each other in time. A channel signal with a slightly high subcarrier frequency will consistently need less time to digitize the data for each fixed bit length packet, thus requiring a shorter time period and fewer pad bits between successive packets. Conversely, a signal with a slightly low subcarrier will take a longer time to digitize, requiring the associated packetizer to wait longer for the digitized data for each packet. As a result, more pad bits will be utilized between successive packets. The ability of the present system to vary the number of pad bits between successive packets, and to determine the time interval of each fixed bit length packet at the receiver, enables the communication of a plurality of asynchronous signals simultaneously.

Figure 1:
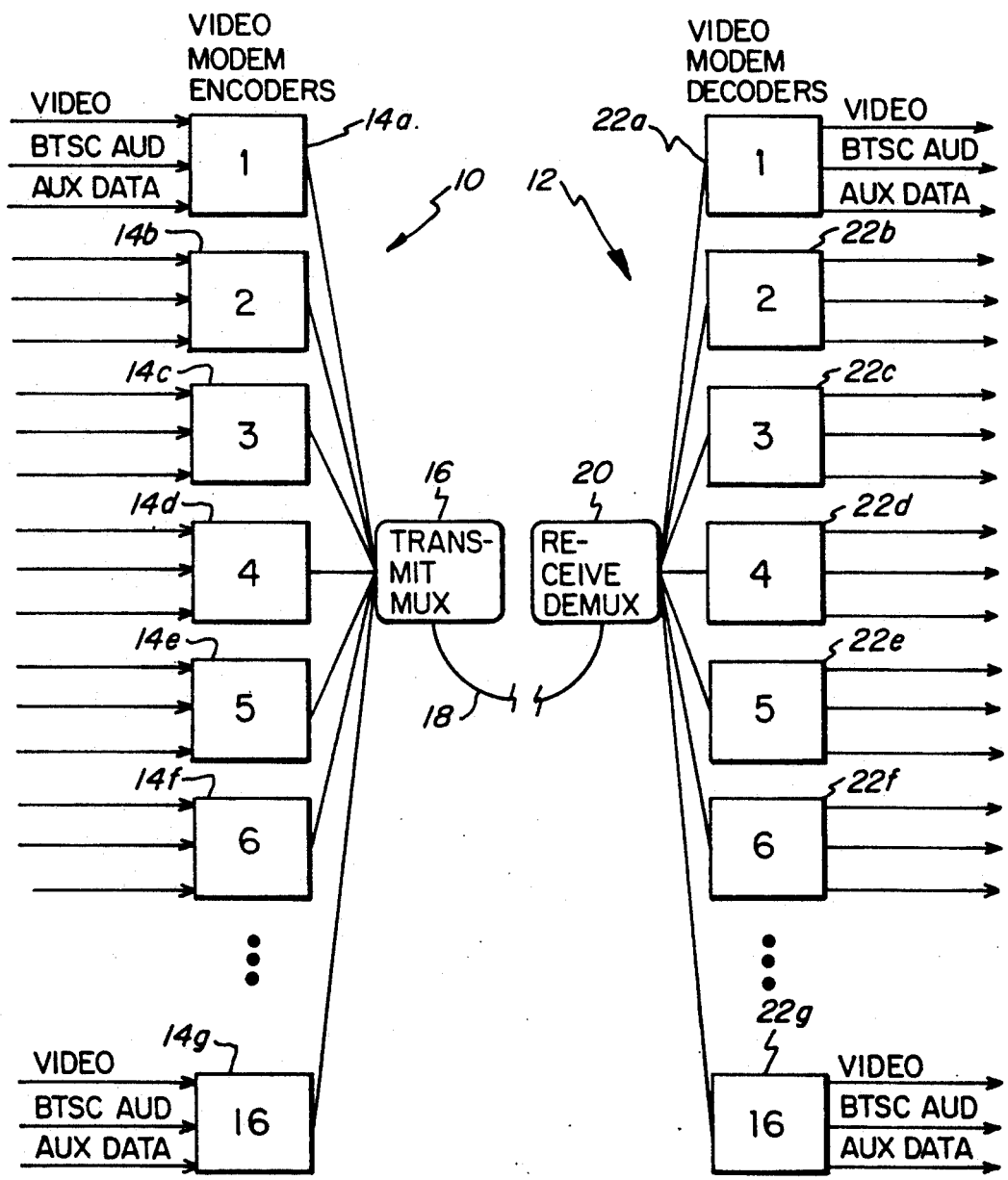
FIG. 1 is block diagram illustrating a communication system in accordance with the present invention.

FIG. 1 is an overall block diagram of a cable television communication system in accordance with the present invention. It should be appreciated that a cable television system is illustrated only as an example, and that the invention is applicable to a wide variety of other communication systems. Transmitter components generally designated 10 include a plurality of video modem encoders 14a-14g. Each encoder receives a cable television channel signal including video information, Broadcast Television Standards Committee ("BTSC") audio information, and auxiliary data. Each encoder digitizes and packetizes its respective television channel signal and outputs a serial data stream to a transmission multiplexer 16 that combines the digital signals from all the encoders into a single data stream for transmission. Conventional time division multiplexing ("TDM") or other known techniques can be used by multiplexer 16 to combine the signals. The multiplexed data stream is transmitted via a digital data link 18, such as an optical fiber communication path. As will be appreciated by those skilled in the art, in order to transmit the data over an optical path, it must be applied to a modulator which modulates an optical carrier laser beam or other light source that will carry the signal over the fiber.

Transmit multiplexer 16 contains a highly accurate oscillator that controls the output of data for transmission. When time division multiplexing is used, each of the video modem encoders 14a-14g is given a "slot" in the TDM data stream. This allows each encoder to have a fixed serial data rate. The encoders insert all necessary overhead information into the data stream prior to passing it to the transmission system. The sequence of the TDM data is fixed, and therefore once the data from any one encoder is located, it is known which data corresponds to each other encoder.

FIG. 1 also illustrates receiver components generally designated 12. The multiplexed data stream from digital data link 18 is received at a receiver demultiplexer 20, where it is broken down into the individual data signals originally output from each video modem encoder. The received data for each channel is input to a respective video modem decoder 22a-22g. Each decoder separates its received signal into the individual video, BTSC audio, and auxiliary data from each packet. The retrieved data is then converted back to an analog form at a digital to analog conversion rate equal to the rate at which the data was originally digitized by the encoder. The rate for each channel is calculated from the time interval between successive packets for the channel, as described in greater detail below. The reconstructed analog data is output from the video modem decoders for reproduction by a television receiver.

Figure 2:
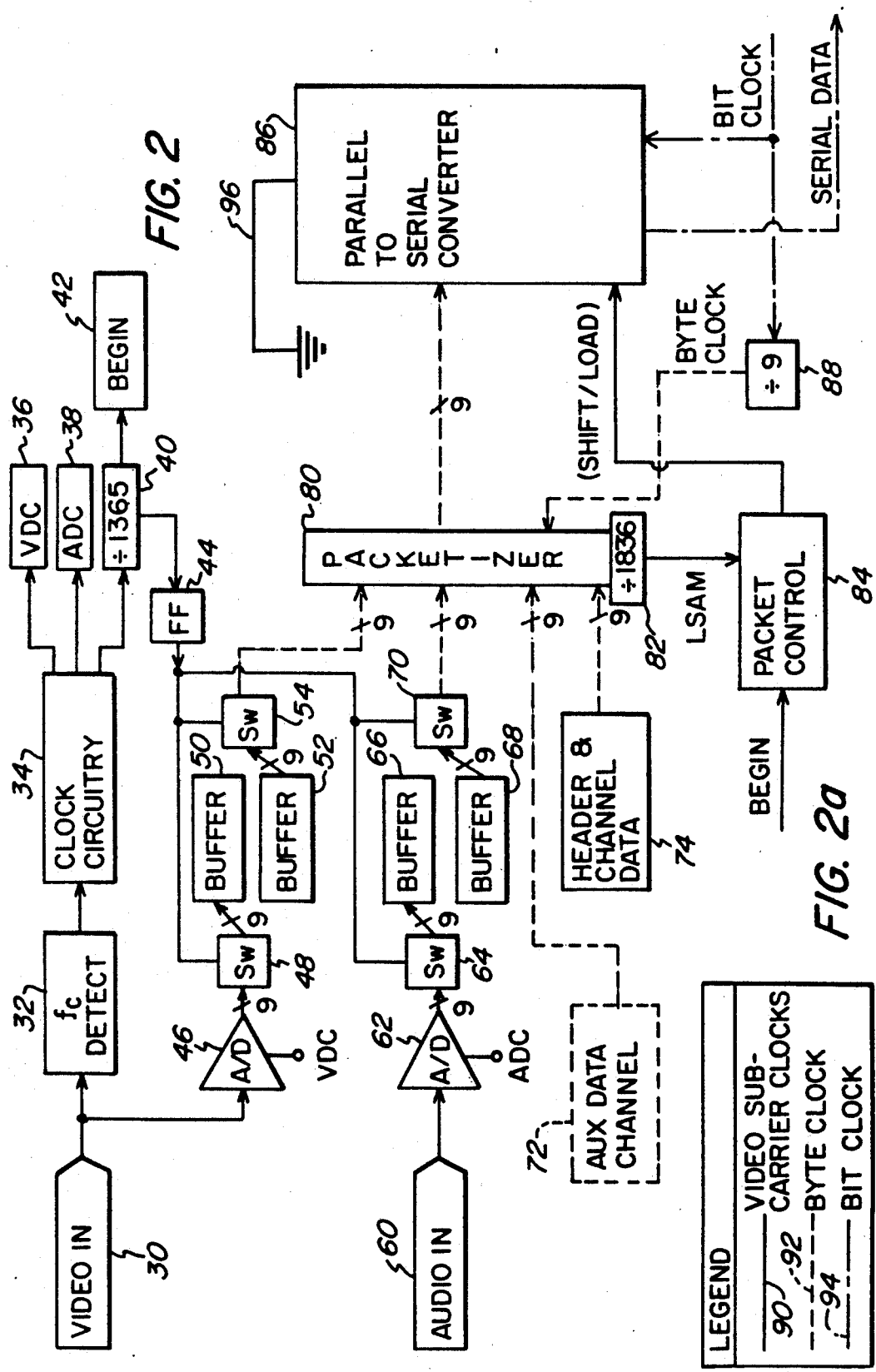
FIG. 2 is a detailed block diagram of an encoder for use in the system of the present invention.

FIG. 2 is a block diagram of a video modem encoder for a single television channel. The video portion of an incoming channel signal 30 is input to a color subcarrier frequency ("$f_c$") detection circuit 32. The detected subcarrier frequency is output to clock circuitry 34 that generates a master clock signal as a function of the subcarrier frequency. As an example, NTSC broadcast standards provide for a color subcarrier frequency of 3.579545 MHz±10 Hz. In an illustrative embodiment, clock circuitry 34 can multiply the color subcarrier (e.g., 3.579545 MHz) by six to derive a master clock frequency of 21.47727 MHz. This master clock is then used to generate a video digitizing clock ("VDC") 36 and an audio digitizing clock ("ADC") 38. For example, the VDC might be one-half the master clock frequency (i.e., 10.738635 MHz) and the ADC one-sixth the master clock frequency (i.e., the color subcarrier frequency of 3.579545 MHz). Those skilled in the art will appreciate that the numbers provided are only examples, and other frequencies can be used depending on the system requirements.

In the illustrative embodiment of FIG. 2, the circuitry will provide data packets containing a set of data completely describing two lines of video, the equivalent time in audio, and any associated control and/or auxiliary data. Each data packet will contain 9-bit bytes of information as follows:

5 video header bytes
1 video identification byte including channel number information
  1365 video bytes
  2 checksum bytes
  5 audio header bytes
  1 audio identification byte
  455 audio bytes
  2 checksum bytes The resultant packet will contain a total of 1836 bytes for transmission. As will be clear from the following description, the encoder produces a packetized parallel digital stream 9 bits wide, that is converted to a serial format for transmission.

A "BEGIN" signal pulse 42 is provided at the beginning of each packet. This is accomplished by dividing the master clock frequency by 1365 at divider 40, the divisor being the number of video samples contained in each packet. The output of divider 40 is also input to a T-type flip-flop that provides a switching signal for toggling complementary buffers 50, 52 and 60, 68 as described in detail below.

The video portion 30 of the television signal is also coupled to an analog to digital converter 46 that digitizes the video information at the video digitizing clock rate. A/D converter 46 outputs a 9 bit parallel data signal to switch 48, that is toggled by the signal output from flip-flop 44 once every 1365 video samples. Switch 48 alternately loads buffer 50 and buffer 52 with the next successive 1365 bytes of video information. While buffer 50 is being loaded at the VDC rate, buffer 52 is being read via switch 54 at a second rate that is asynchronous with and greater than the VDC rate. In particular, buffer 52 is read at a low output clock rate ("byte clock") designated by a dashed signal path as indicated at 92 in FIG. 2a. The byte clock is related to a high output clock rate ("bit clock") at which the final serial data stream is transmitted from the encoder. The high output clock rate is indicated by a dashed and dotted line as shown at 94 of FIG. 2a. In the example shown in FIG. 2, the low output clock rate at which data is read from the buffers is one-ninth the rate of the high output clock corresponding to the 9 bit byte length of the parallel data.

After a 1365 byte sample of video has been read into buffer 50, buffers 50, 52 are interchanged by switches 48, 54 in response to the buffer toggle signal output from flip-flop 44. The data for the next packet is then read into buffer 52 at the VDC rate, while the previously loaded packet data is output from buffer 50 at the byte clock rate.

Audio information is processed similarly. The audio portion 60 of the television signal is input to an analog to digital converter 62 that digitizes the information at the audio digitizing rate. The digitized data is output as 9 bit bytes from A/D converter 62 to complementary buffers 66, 68 via switch 64. While buffer 66 is being loaded at the audio digitizing clock rate, buffer 68 is being unloaded at the faster byte clock rate via switch 70. After a full packet of audio data has been loaded into buffer 66 (455 bytes), the toggle signal from flip-flop 44 will arrive at switches 64, 70 and the buffers will be interchanged. Buffer 68 is then loaded with data at the ADC rate while buffer 66 is unloaded at the byte clock rate.

The video and audio data from the buffers is unloaded into a packetizer 80, together with header and channel identification data from circuitry 74. A video header and an audio header are provided within each packet. The video header identifies the commencement of each new packet. Both the video and audio headers can contain a byte count for use by the receiver in recovering the data, as well as information identifying both the video data (for input to video buffers at the receiver) and the audio data (for input to audio buffers at the receiver). Header and data channel circuitry 74 also provides checksum data for incorporation into the packets for use in verifying the integrity of data transmission.

Auxiliary data from optional auxiliary data channel circuitry 72 can also be input to packetizer 80. This circuitry will include an analog to digital converter for receiving incoming auxiliary data together with switches and buffers that operate in the same manner as those components in the video and audio data paths.

Packetizer 80 assembles the incoming video data, audio data, and auxiliary data (if present) with the header and channel data to provide fixed length packets having a fixed interval derived from the frequency of master clock circuitry 34. In the example illustrated in FIG. 2, the interval is the amount of time it takes 1365 video samples to be digitized. The audio data sampling rate is set so that 455 bytes of audio information are digitized in the same amount of time it takes to digitize the 1365 video samples. Similar criteria are used in the event auxiliary data is provided via circuitry 72.

In assembling packets, packetizer 80 reads the incoming data and adds header, control and checksum information to provide the packet format set forth above. As noted above, the final packet contains 1836 bytes of data. The operation of packetizer 80 is controlled by the byte clock signal produced by dividing the bit clock by nine at divider 88. The data packets are output to a parallel to serial converter 86 that operates at the bit clock rate to provide a serial data stream for transmission.

Packet control circuitry 84 enables the transmission of a continuous data stream. As noted above, the packetizer outputs data at a rate that is asynchronous with and greater than the rate at which data is loaded by the A/D converters 46, 62 into their respective buffers. Accordingly, there will be a varying time interval between the time that a buffer is emptied and a complementary buffer has been filled. This variable time interval is filled with pad bits (e.g., zeroes) in response to a "LOAD" signal output from a packet control circuit 84. In particular, the "BEGIN" signal 42 that indicates the commencement of each new packet is input to packet control 84. Upon receipt of this signal, packet control 84 actuates parallel to serial converter 86 to start shifting the next packet of data from packetizer 80 for conversion to a serial format. While this is occurring, packetizer 80 counts the number of bytes it outputs. After every 1836 bytes (the length of a packet) a last sample ("LSAM") signal is output from a divider 82 to packet control 84, which immediately instructs parallel to serial converter 86 to stop shifting new data and to commence the loading of pad bits into the output data stream.

The pad bits are generated by connecting the output line to ground via path 96. Parallel to serial converter 86 continues to fill the data stream with pad bits until it receives a "SHIFT" signal from packet control 84. This occurs when the packet control circuitry receives the next BEGIN signal, indicating the commencement of the next successive packet.

FIG. 4 illustrates the timing of the various signals within the system encoder of FIG. 2. Bytes 140 at the top of the serial stream 142 indicate those coming from the buffers. Output data stream 142 illustrates the end portion of a first data packet and the beginning portion of the next data packet. The data packets are separated by pad bits (zeros) as indicated at 143, at which point the incoming bytes 140 can be seen to be asymmetric in time. The video samples being read into the buffers from A/D converter 46 are designated by reference numerals 160 at the bottom of the timing diagram. These samples are always symmetric in time.

The sequence between successive data packets begins when a "NEXT" signal 144 falls, indicating that the packetizer is ready to receive data. The NEXT signal, generated in the packetizer from the byte clock, is functionally the same as the byte clock signal at all times except between successive packets. Between packets, the NEXT signal is delayed until receipt of a BEGIN signal, so that there will not be a collision of packet data with pad bits. The delay of the NEXT signal between successive packets is caused by the LSAM signal 146. As can be seen in FIG. 4, the NEXT signal normally goes high after the ninth bit of each byte in the output data stream. This pattern continues for the last sample, at time ②, as indicated by the rising edge of the LSAM signal at time ①. Normally, the NEXT signal would rise again at time ③, except that the continued high state of the LSAM signal precludes this from occurring. This enables the pad bits 143 to be inserted between time ③ and time ⑥, when the NEXT signal rises again in response to the BEGIN pulse at time ④. The loading of the pad bits occurs in response to the LSAM signal being received by packet control circuitry 84 as explained above.

When the last sample 160' of a packet has been read into the video buffer, a BEGIN pulse occurs at time ④. At the same time, buffer toggle signal 150 (from flip-flop 44) causes the buffers to flip, and the appropriate address registers and data paths in the system encoder to be switched. At this point, the first ready byte of the next packet (a header byte) is presented at time ⑤ to the packetizer and the NEXT signal is asserted at time ⑥. The data for the next packet is then packetized and inserted into the output data stream.

When parallel to serial converter 86 is shifting out pad bits, packet control 84 is constantly monitoring the BEGIN line. When the BEGIN line is asserted, packetizer 80 latches the ready data and begins outputting the normal nine bit sequence. At no time are bits truncated. When the first byte is latched, the action of the rising edge of the NEXT line (latching the data) also signals the packetizer to drop the LSAM line at time ⑦.

The timing sequence illustrated in FIG. 4 causes the 1836 byte "payload" to shift in time inside an envelope. When slippage becomes greater than one bit time, that bit is automatically dropped from the stream by filling the interval between successive packets with one less pad bit. It is this slippage that allows the system to operate with different subcarrier frequencies, and therefore different digitizing rates for each channel. When the color subcarrier $f_c$ is exactly 3579545 Hz, the acquisition of 1365 samples at a video digitizing rate of $3*f_c$ takes 127.1111273 μs. For purposes of the following illustration, it is assumed that the transmission of data for a first packet starts at exactly the same instant as the acquisition of video samples for the following packet. Sending 1836 samples from the first packet takes 127.0710373 μs when the transmission bit rate is 14.4486111 megabits per second. This rate occurs, for example, when the transmission frequency of the multiplexed serial data (16 channels) is 2.0806 GHz and the byte clock is one-ninth of the bit clock. (2,0806 GHz÷16÷9=14.4486111 megabits/sec.) When six pad bits are added at 7.6900894 nS each, the transmission time is now 127.1171777 μs. In other words, the start of transmission for the next data packet actually starts 6.050485 nS (127.1171777 μs-127.1111273 μs) after the start of acquiring the video samples for the following packet. Since this is less than the amount of time it takes to transmit one pad bit, no additional pad bits can be added at this point. If five pad bits are added to the end of the second data packet, the transmission of the third data packet is pushed to 4.4108806 nS (254.2266654 μs-254.2222545 μs) after the start of video acquisition for the fourth data packet. This action will continue until the start of the transmission sequence is delayed such that at the end of the transmission sequence, one bit is lost because the output bytes have shifted forward enough in time to lose that bit when a BEGIN signal occurs. This result is illustrated in FIG. 5.

The solid time blocks 162 depicted in FIG. 5 represent the constant rate time requirement for digitizing 1365 bytes of video, at 127.1111273 μs per set. The dashed time blocks 164 represent the time required to send 1836 bytes of data at the output rate, 127.0710373 μs. The timing variations discussed above cause a varying number of pad bits to be required between successive packets, as indicated at 166, 168, and 170, with a pad bit lost due to slippage at 170. In order to implement the pad bit insertion process, the logic must ensure that the time difference between the start of video acquisition and the beginning of the packet transmission is never negative, and will always be less than two bit times. This time period will normally be less than one bit time. There may be a logic race condition if the start of video acquisition occurs coincidentally with the pad bit transition. In this event, transmission must absolutely start on the next output bit transition.

When the color subcarrier $f_c$ is on the high side, the input samples will be grouped slightly closer since increasing $f_c$ decreases the data acquisition period. Relative to the previous sample, the BEGIN signal will come sooner, decreasing the number of pad bits. Conversely, at a lower than normal $f_c$, the number of pad bits will be increased.

Figure 3:
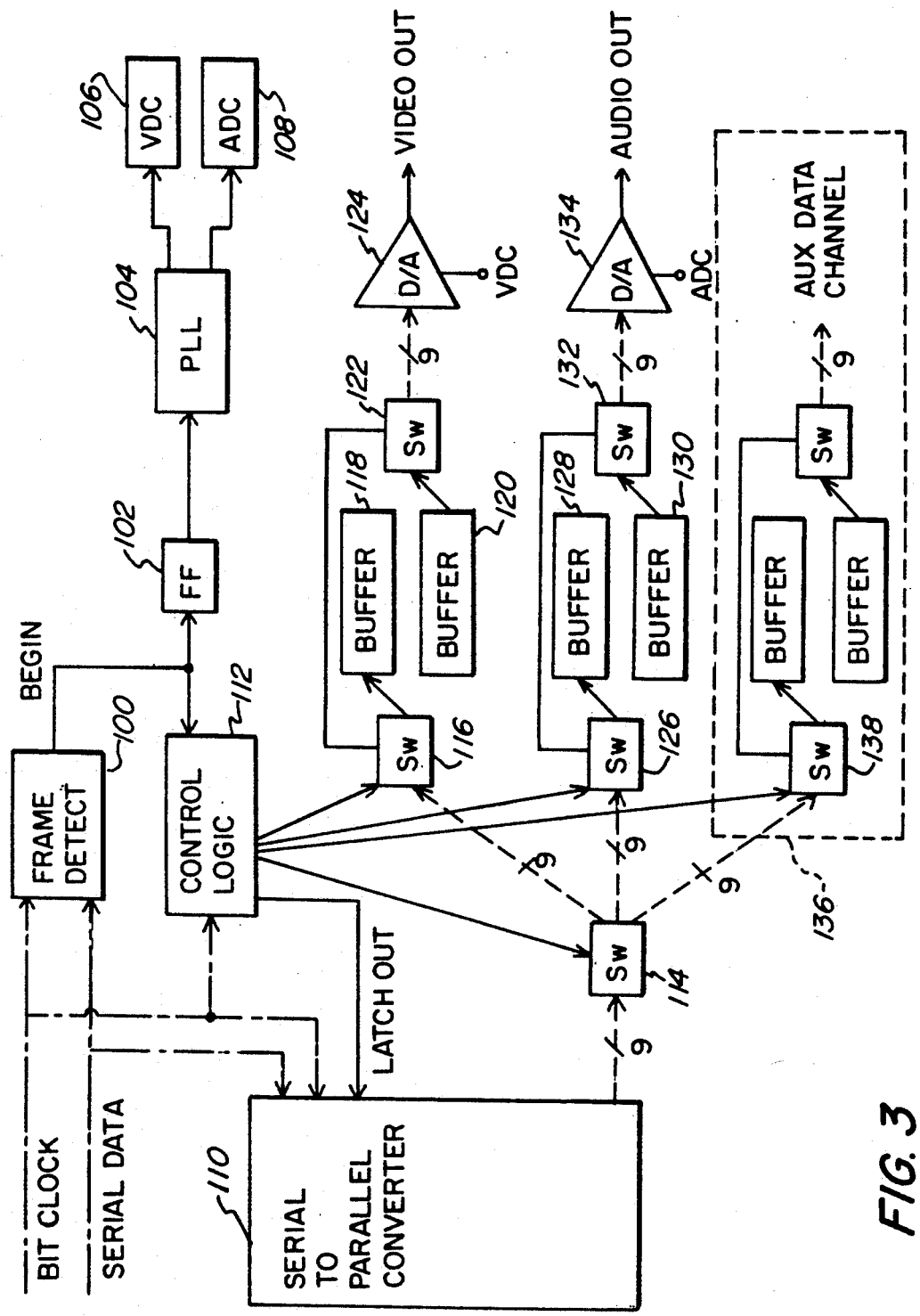
FIG. 3 is a block diagram of decoder apparatus for use in connection with the system of the present invention.

The operation of a decoder for receiving one channel of the transmitted serial data is depicted in the block diagram of FIG. 3. The bit clock and serial data stream are input to a frame detect circuit 100 and a serial to parallel converter 110. Frame detect 100 extracts the master clock frequency from the bit clock (e.g., NRZ data) and monitors the serial data for the first header prior to video information. The first header indicates the occurrence of a new packet, and upon detection thereof, frame detect circuitry 100 generates a BEGIN pulse for output to a T-type flip-flop 102 and control logic circuitry 112. The output of flip-flop 102 is input to a phase lock loop 104 that recovers the video digitizing clock 106 and audio digitizing clock 108. These signals are used to drive digital to analog converters 124, 134, respectively, for recovery of the analog video and audio information.

Control logic 112 controls data switch 114, video switch 116, audio switch 126, and (if provided) auxiliary data switch 138 of optional auxiliary data channel 136 to recover the video, audio, and auxiliary data from the received data packets. Serial to parallel converter 110 is latched by control logic 112 to recreate the 9 bit data bytes. Control logic 112 maintains a bit count for each received bit, and couples the data via switch 114 to video switch 116 when video data bytes are present, to audio switch 126 when audio data bytes are present, and to auxiliary data switch 138 when auxiliary data is present Switch 114 is open during the occurrence of header bytes, ID bytes, checksum bytes, and pad bits as this data is not required by the video, audio, and auxiliary data buffers.

When video data is present in the output stream from serial to parallel converter 110, it is loaded via switch 116 into buffer 118 or buffer 120 at the byte clock rate. As one of buffers 118, 120 is being loaded with data from a current packet, the video data from the prior packet is being read into D/A converter 124 at the VDC rate via switch 122. Similarly, when audio data is present in the output stream from converter 110, it is loaded into buffer 128 or buffer 130 at the byte clock rate via switch 126. While one of buffers 128, 130 is being loaded with data from a current packet, audio data from the prior packet is being read into D/A converter 134 at the ADC rate via switch 132. A similar operation occurs with respect to auxiliary data, if provided. The complementary buffers of each pair are interchanged by a signal from control logic 112 that is responsive to each BEGIN signal from frame detect 100.

In addition to recovering the video, audio and auxiliary information, one of the video modem decoders 22a-22g (FIG. 1) in a multiplexed system must decode enough information from one of the channel data streams to confirm that the correct channel number is being relayed through the system. If the data stream indicates an incorrect channel number (misregistration), the video modem decoder issues a signal that causes the registration of the received data streams to be "bumped" by one, until proper registration has been achieved. Once this occurs, each video modem decoder receives a serial data stream for its intended channel, and decodes the stream to recover the channel information signal. After the serial data stream containing the plurality of asynchronous channel signals has been demultiplexed, there is no further interaction between the multiple video modem decoders.

It should now be appreciated that the present invention provides a method and apparatus for communicating multiple asynchronous signals through a digital link. The system operation is dependent upon the provision of data packets having a fixed time interval for a given number of data samples. By detecting this interval at the receiver, and dividing by the number of samples, the digitizing rate for the received signal can be computed and used to recreate the original information. The insertion of a variable number of pad bits between successive packets enables the transmission of the data at a rate which is greater than and asynchronous with the digitizing rate. The transmission rate for each of the channels is the same, so that all of the channel data can be multiplexed into a continuous data stream for transmission.

Although the invention has been described in connection with a preferred embodiment, those skilled in the art will appreciate that numerous modifications and adaptations may be made thereto, without departing from the spirit and scope of the invention as set forth in the following claims.

What is claimed is:

1. Apparatus for communicating signals over a digital communication path comprising:

means for digitizing an information signal at a first rate to provide digital data for processing into data packets;

means for providing a periodic begin signal synchronous with said first rate and indicative of the occurrence of successive new data packets;

means for outputting said data packets for transmission at a second rate greater than and asynchronous with said first rate, thereby producing a variable time interval between successive transmitted packets; and means, operatively associated with said outputting means and responsive to said begin signal, for filling the time intervals between successive packets with pad bits to provide a continuous data stream for transmission.

2. Apparatus in accordance with claim 1 further comprising:

receiver means for receiving the transmitted data packets;

means responsive to the received data packets for generating a timing signal corresponding to said first rate; and means responsive to the timing signal for reconstructing said information signal from the received data packets.

3. Apparatus in accordance with claim 1 wherein:
said information signal is a communication signal having at least one subcarrier; and
said first rate is derived from the frequency of said subcarrier.

4. Apparatus in accordance with claim 1 wherein:
said information signal is a television signal; and
said first rate is derived from the color subcarrier frequency of the television signal.

5. Apparatus in accordance with claim 1 further comprising:
means for processing a plurality of channels of asynchronous information signals in the same manner as said information signal; and
means for combining said plurality of information signals to provide a multiplexed data stream for transmission at a rate that is synchronous with said second rate.

6. Apparatus in accordance with claim 5 further comprising:
receiver means for receiving the multiplexed data stream;
means for demultiplexing the received data stream to recover the data packets for each channel;
means responsive to the recovered data packets for each channel for generating an associated timing signal that corresponds to the first rate used to digitize the data for that particular channel; and
means responsive to the timing signal for each channel for reconstructing the original information signals represented by the recovered data packets.

7. Apparatus in accordance with claim 5 wherein:
said information signals are television signals; and
the first rate for each information signal is derived from its color subcarrier frequency.

8. Apparatus for communicating a plurality of asynchronous signals over a digital transmission path comprising:
means for digitizing an information signal at a first rate to provide digital data;
buffer means coupled to receive said data at said first rate for storage;
packetizing means coupled to receive said data from said buffer means at a second rate greater than said first rate for processing into data packets;
means for providing a periodic begin signal that is synchronous with said first rate and indicative of the occurrence of successive data packets;
means for outputting said data packets for transmission at said second rate with a time interval between successive packets resulting from the difference in time it takes the buffer means to receive data at said first rate and the outputting means to output data at said second rate; and
means, operatively associated with said outputting means and responsive to said begin signal, for filling the time intervals between successive packets with pad bits to provide a continuous data stream for transmission.

9. Apparatus in accordance with claim 8 wherein:
said digitizing means provide parallel data for input to said buffer means and processing by said packetizing means; and
said outputting means convert parallel data from said packetizing means to a serial output stream for transmission.

10. Apparatus in accordance with claim 8 wherein said buffer means comprise:
a pair of complementary buffers; and
switch means for coupling one buffer of said pair to receive data from the digitizing means while the other buffer of said pair is coupled to output data to said packetizing means, and vice-versa.

11. Apparatus in accordance with claim 10 wherein said switch means are responsive to said begin signal for alternately coupling said buffers to receive data and output data in complement.

12. Apparatus in accordance with claim 8 wherein said information signal is a television signal and said first rate is derived from a subcarrier frequency thereof.

13. Apparatus in accordance with claim 8 wherein said information signal is a television signal and said digitizing means comprise:
a first analog to digital converter for digitizing a video portion of said television signal at said first rate; and
a second analog to digital converter for digitizing an audio portion of said television signal at a digitizing rate that is synchronous with said first rate.

14. Apparatus in accordance with claim 13 wherein said buffer means comprise:
a first pair of complementary buffers associated with said first analog to digital converter;
first switch means for coupling one buffer of said first pair to receive video data while the other buffer of said first pair is coupled to output video data to said packetizing means, and vice-versa;
a second pair of complementary buffers associated with said second analog to digital converter; and
second switch means for coupling one buffer of said second pair to receive audio data while the other buffer of said second pair is coupled to output audio data to said packetizing means, and vice-versa.

15. Apparatus in accordance with claim 14 wherein said first and second switch means are responsive to said begin signal for switching said buffers.

16. Apparatus in accordance with claim 8 further comprising:
means for inputting packet header data to said packetizing means for incorporation into said data packets.

17. Apparatus in accordance with claim 16 wherein said packetizing means is responsive to said begin signal for incorporating header data into said packets.

18. Apparatus in accordance with claim 16 further comprising:
means for inputting auxiliary data to said packetizing means for incorporation into said data packets.

19. Apparatus in accordance with claim 8 further comprising:
means for processing a plurality of channels of asynchronous information signals in the same manner as said information signal; and
means for combining said plurality of information signals to provide a multiplexed data stream for transmission at a rate that is synchronous with said second rate.

20. Apparatus in accordance with claim 19 wherein said information signals are television channel signals.

21. Apparatus in accordance with claim 20 wherein each television signal is digitized at a corresponding first rate derived from its color subcarrier frequency.

22. Apparatus in accordance with claim 20 wherein said digitizing means comprise:

first analog to digital converter means for digitizing a video portion of each television channel signal at a respective first rate for the signal; and second analog to digital converter means for digitizing an audio portion of each television channel signal at a digitizing rate that is synchronous with the respective first rate for the signal.

23. Apparatus in accordance with claim 22 wherein said buffer means comprise:

a first pair of complementary buffers associated with the first analog to digital converter means for each channel signal;

first switch means associated with the first pair of buffers for each channel signal for coupling one buffer of each first pair to receive video data while the other buffer of each first pair is coupled to output video data to said packetizing means, and vice-versa;

a second pair of complementary buffers associated with the second analog to digital converter means for each channel signal; and second switch means associated with the second pair of buffers for each channel signal for coupling one buffer of each second pair to receive audio data while the other buffer of each second pair is coupled to output audio data to said packetizing means, and vice-versa.

24. Apparatus in accordance with claim 23 wherein said first and second switch means for each channel signal are responsive to that channel signal's begin signal to switch the associated buffers.

25. Apparatus in accordance with claim 19 further comprising:

receiver means for receiving a plurality of channels of transmitted data packets contained in said multiplexed data stream;

means for demultiplexing said data stream to recover the data packets for each channel;

means, responsive to an interval in which the recovered data packets for each channel are received, for generating a timing signal for each channel corresponding to the first rate used to digitize the data for that particular channel; and means responsive to said timing signals for reconstructing the original information signals represented by the recovered data packets.

26. Apparatus in accordance with claim 25 wherein:
said information signals are television signals; and
the first rate for each information signal is derived from its color subcarrier frequency.

27. Apparatus in accordance with claim 8 further comprising:

receiver means for receiving the transmitted data packets;

means, responsive to an interval in which successive data packets are received, for generating a timing signal corresponding to said first rate; and means responsive to the timing signal for reconstructing said information signal from the received data packets.

28. Apparatus in accordance with claim 27 wherein:
said information signal is a television signal; and
said first rate is derived from the color subcarrier frequency of the television signal.

29. Apparatus in accordance with claim 8 wherein said information signal contains a plurality of signals which are separately digitized for input to said buffer means at rates that are synchronous with said first rate and less than said second rate.

30. Apparatus in accordance with claim 29 wherein:
said information signal is a television signal; and
said plurality of signals include a video signal and an audio signal.

31. Apparatus in accordance with claim 30 further comprising:

means for inputting header data to said packetizing means for incorporation into said data packets.

32. Apparatus in accordance with claim 31 further comprising:

means for inputting auxiliary data to said packetizing means for incorporation into said data packets.

33. Apparatus in accordance with claim 8 further comprising:

means for inputting header data to said packetizing means for incorporation into said data packets.

34. Apparatus in accordance with claim 33 further comprising:

means for inputting auxiliary data to said packetizing means for incorporation into said data packets.

35. A data receiver for processing data packets from a digital communication path comprising:

means for receiving serially transmitted data packets at a serial transmission rate, said data packets containing data representing a digitized information signal;

means, responsive to an interval in which successive data packets are received, for generating a timing signal corresponding to a digitizing rate at which said information signal was digitized; and means responsive to said timing signal for reconstructing said information signal from the received data packets.

36. A data receiver in accordance with claim 35 wherein:

said data packets contain a fixed number of samples of a predetermined type; and said timing signal is generated by dividing said interval by said fixed number.

37. A data receiver in accordance with claim 36 wherein:

said information signal is a television signal and said samples are video data samples.

38. A data receiver in accordance with claim 36 further comprising:

means for detecting a header in each received data packet; and means responsive to said detecting means for determining said interval.

39. A data receiver in accordance with claim 35 further comprising:

buffer means for receiving data from said packets at a first rate that is synchronous with said serial transmission rate; and means responsive to said timing signal for reading said data out of said buffer means at a second rate that is synchronous with said digitizing rate;

wherein the data read out of said buffer is input to said reconstructing means for reconstruction of said information signal.

40. A data receiver in accordance with claim 39 wherein said first rate is greater than said second rate.

41. A data receiver in accordance with claim 40 wherein said buffer means comprise:

a pair of complementary buffers; and switch means for coupling one buffer of said pair to receive data from said packets at said first rate while the other buffer of said pair is coupled to output data to said reconstructing means, and vice-versa.

42. A data receiver in accordance with claim 41 wherein said switch means are responsive to actuation signals derived from received data packets.

43. A data receiver in accordance with claim 42 wherein:
said information signal is a television signal having video and audio portions; and
said buffer means comprise a separate pair of complementary buffers and associated switch means for each of said video and audio portions.

44. A data receiver in accordance with claim 43 further comprising:
an additional pair of complementary buffers and associated switch means for processing auxiliary data contained in said data packets.

45. A data receiver in accordance with claim 35 wherein:
said receiving means receive data packets from a plurality of channels carrying different asynchronous digitized information signals;
said generating means generate timing signals for each channel corresponding to the digitizing rate at which the information signal carried by the channel was digitized; and
said reconstructing means reconstruct the information signals for each channel in response to the timing signal for that channel.

46. A data receiver in accordance with claim 45 wherein said channels are television signal channels.

47. A data receiver in accordance with claim 46 further comprising:
means for coupling said receiving means to a cable television network for receipt of said channels.

48. A data receiver in accordance with claim 46 wherein:
said data packets contain a fixed number of samples of a predetermined type; and
said timing signal is generated by dividing said interval by said fixed number.

49. A data receiver in accordance with claim 48 wherein said samples are video data samples.

50. A data receiver in accordance with claim 49 wherein said information signal digitizing rates are derived from the color subcarrier frequency of the respective television signal.

51. A method for communicating signals over a digital communication path comprising the steps of:
digitizing an information signal at a first rate;
packetizing said digitized signal for transmission at a second rate greater than and asynchronous with said first rate, wherein a variable time interval results between successive transmitted packets; and
filling the time interval between each successive packet with pad bits to provide a continuous data stream for transmission.

52. A method in accordance with claim 51 wherein each packet contains a fixed number of data bits digitized over a fixed time interval related to said first rate.

53. A method in accordance with claim 52 wherein:
said information signal is a television signal; and
said first rate is derived from a subcarrier frequency of said television signal.

54. A method in accordance with claim 52 comprising the further steps of:
receiving said continuous data stream after transmission;
monitoring the receipt of successive packets to determine said fixed time interval;
computing said first rate from said fixed time interval; and
converting said data packets to an analog signal at the computed first rate to reconstruct said information signal.

55. A method in accordance with claim 54 wherein said information signal is a television signal having a video portion and an audio portion.

56. A method in accordance with claim 55 wherein said first rate is computed at the receiving end of said transmission by dividing said fixed time interval by a number of video data samples contained in a packet.

57. A method in accordance with claim 56 wherein said first rate is derived from a subcarrier frequency of the television signal.

58. A method for communicating a plurality of asynchronous communication signals over a digital communication path comprising the steps of:
digitizing each of a plurality of information signals at a digitizing rate derived from a component of the signal;
packetizing each digitized signal for communication at a transmission rate greater than and asynchronous with its digitizing rate, wherein a variable time interval results between successive transmitted packets for each signal;
filling the time interval between each successive packet for each signal with pad bits to provide a continuous data stream; and
multiplexing the data streams for all of said signals to provide a combined data stream for transmission.

59. A method in accordance with claim 58 wherein each packet for each of said signals contains a fixed number of data bits digitized over a fixed time interval related to the digitizing rate for the signal.

60. A method in accordance with claim 59 comprising the further steps of:
receiving said combined data stream after transmission;
monitoring the receipt of successive packets for each signal to determine the fixed time interval for the signal;
computing the digitizing rate for each signal from its fixed time interval; and
converting the data packets for each signal to an analog form at the computed digitizing rate for the signal to reconstruct said plurality of information signals.

* * * * *